United States Patent
Wu (10) Patent No.: US 10,105,931 B2
(45) Date of Patent: Oct. 23, 2018

(54) MULTI-SECTION CORE VACUUM INSULATION PANELS WITH HYBRID BARRIER FILM ENVELOPE

(71) Applicant: WHIRLPOOL CORPORATION, Benton Harbor, MI (US)

(72) Inventor: Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 80 days.

(21) Appl. No.: 15/426,579

(22) Filed: Feb. 7, 2017

(65) Prior Publication Data

US 2017/0144412 A1    May 25, 2017

Related U.S. Application Data

(62) Division of application No. 14/187,605, filed on Feb. 24, 2014, now Pat. No. 9,689,604.

(51) Int. Cl.
| | |
|---|---|
| *B32B 1/06* | (2006.01) |
| *B32B 17/06* | (2006.01) |
| *B32B 5/06* | (2006.01) |
| *F25D 23/06* | (2006.01) |

(52) U.S. Cl.
CPC .............. *B32B 17/067* (2013.01); *B32B 5/06* (2013.01); *F25D 23/06* (2013.01); *F25D 23/063* (2013.01); *B32B 2305/22* (2013.01); *B32B 2305/30* (2013.01); *B32B 2307/304* (2013.01); *B32B 2307/728* (2013.01); *B32B 2309/68* (2013.01);
(Continued)

(58) Field of Classification Search
USPC .................. 428/426, 428, 68, 69, 74, 76
See application file for complete search history.

(56) References Cited

U.S. PATENT DOCUMENTS

| 948,541 A | 2/1910 | Coleman |
|---|---|---|
| 1,275,511 A | 8/1918 | Welch |
| 1,849,369 A | 3/1932 | Frost |

(Continued)

FOREIGN PATENT DOCUMENTS

| CA | 626838 A | 5/1961 |
|---|---|---|
| CA | 1320631 | 7/1993 |

(Continued)

OTHER PUBLICATIONS

International Search Report, International Application No. PCT/US2016/060519, dated Mar. 16, 2017, 10 pages.

(Continued)

*Primary Examiner* — Lauren R Colgan
(74) *Attorney, Agent, or Firm* — Price Heneveld LLP (57) ABSTRACT

A multi-layer vacuum insulating panel that includes: a first barrier film having at least one polymeric material layer and; a second barrier film having at least one interior polymeric layer, a metal foil layer, and at least one exterior polymeric layer positioned on the opposite side of the metal foil layer as the at least one interior polymeric layer; a sealing junction between the first barrier film and the second barrier film at a sealing section about a perimeter of the first barrier film and the second barrier film where the first barrier film and the second barrier film physically and sealingly engage one another; and a multi-section central core having a first fumed silica region that contains at least one fumed silica compound and at least one fibrous (fiberglass) region that are each discrete regions within the interior volume.

14 Claims, 9 Drawing Sheets

(52) U.S. Cl.
CPC ...... *B32B 2509/10* (2013.01); *F25D 2201/14* (2013.01)

(56) References Cited

U.S. PATENT DOCUMENTS

| | | | |
|---|---|---|---|
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Costantini et al. |
| 3,137,900 A | 6/1964 | Carbary |
| 3,218,111 A | 11/1965 | Steiner |
| 3,258,883 A | 7/1966 | Campanaro et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,634,971 A | 1/1972 | Kesling |
| 3,635,536 A | 1/1972 | Lackey et al. |
| 3,688,384 A | 9/1972 | Mizushima et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | Deleeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,805,293 A | 2/1989 | Buchser |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsusumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirell et al. |
| 5,768,837 A | 6/1998 | Sjoholm |
| 5,792,801 A | 8/1998 | Tsuda et al. |
| 5,813,454 A | 9/1998 | Potter |
| 5,826,780 A | 10/1998 | Neeser et al. |
| 5,827,385 A | 10/1998 | Meyer et al. |
| 5,834,126 A | 11/1998 | Sheu |
| 5,843,353 A | 12/1998 | Devos et al. |
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,294,595 B1 | 9/2001 | Tyagi et al. |
| 6,305,768 B1 | 10/2001 | Nishimoto |
| 6,390,378 B1 | 5/2002 | Briscoe, Jr. et al. |
| 8,176,746 B2 | 5/2002 | Briscoe, Jr. et al. |
| 6,406,449 B1 | 6/2002 | Moore et al. |

(56) References Cited

U.S. PATENT DOCUMENTS

| | | |
|---|---|---|
| 6,408,841 B1 | 6/2002 | Hirath et al. |
| 6,415,623 B1 | 7/2002 | Jennings et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,449,227 B2 | 11/2008 | Echigoya et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Heimeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hoffmann et al. |
| 8,434,317 B2 | 5/2013 | Besore |
| 8,439,460 B2 | 5/2013 | Laible et al. |
| 8,456,040 B2 | 6/2013 | Allard et al. |
| 8,491,070 B2 | 7/2013 | Davis et al. |
| 8,516,845 B2 | 8/2013 | Wuesthoff et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,840,204 B2 | 9/2014 | Bauer et al. |
| 8,852,708 B2 | 10/2014 | Kim et al. |
| 8,881,398 B2 | 11/2014 | Hanley et al. |
| 8,905,503 B2 | 12/2014 | Sahasrabudhe et al. |
| 9,009,969 B2 | 4/2015 | Choi et al. |
| RE45,501 E | 5/2015 | Maguire |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,170,045 B2 | 10/2015 | Oh et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,429,356 B2 | 8/2016 | Kim et al. |
| 9,448,004 B2 | 9/2016 | Kim et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 2002/0114937 A1 | 8/2002 | Albert et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0173883 A1 | 9/2003 | Koons |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0263571 A1 | 11/2006 | Tsunetsugu et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0048540 A1 | 2/2008 | Kim |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |

(56) References Cited

U.S. PATENT DOCUMENTS

| | | |
|---|---|---|
| 2009/0324871 A1 | 12/2009 | Henn |
| 2010/0170279 A1 | 7/2010 | Aoki |
| 2010/0206464 A1 | 8/2010 | Heo et al. |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horii et al. |
| 2011/0315693 A1 | 12/2011 | Cur et al. |
| 2012/0000234 A1 | 1/2012 | Adamski et al. |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0346942 A1 | 11/2014 | Kim et al. |
| 2014/0364527 A1 | 12/2014 | Matthias et al. |
| 2015/0015133 A1 | 1/2015 | Carbajal et al. |
| 2015/0027628 A1 | 1/2015 | Cravens et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0184923 A1 | 7/2015 | Jeon |
| 2015/0190840 A1 | 7/2015 | Muto et al. |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0191746 A1 | 7/2017 | Seo |

FOREIGN PATENT DOCUMENTS

| | | |
|---|---|---|
| CA | 2259665 A1 | 1/1998 |
| CA | 2640006 A1 | 8/2007 |
| CN | 1158509 A | 4/2002 |
| CN | 100359272 A | 12/2005 |
| CN | 1970185 A | 5/2007 |
| CN | 101437756 A | 5/2009 |
| CN | 201680116 U | 12/2010 |
| CN | 201748744 U | 2/2011 |
| CN | 102296714 A | 12/2011 |
| CN | 102452522 A | 5/2012 |
| CN | 102717578 A | 10/2012 |
| CN | 102720277 A | 10/2012 |
| CN | 103072321 A | 5/2013 |
| CN | 202973713 U | 6/2013 |
| CN | 203331442 U | 12/2013 |
| CN | 104816478 A | 8/2015 |
| CN | 105115221 | 12/2015 |
| CN | 2014963379 U | 1/2016 |
| DE | 1150190 B | 6/1963 |
| DE | 4110292 A1 | 10/1992 |
| DE | 19818890 A1 | 11/1999 |
| DE | 19915311 A1 | 10/2000 |
| DE | 102008026528 | 12/2009 |
| DE | 102009046810 | 5/2011 |
| DE | 102010024951 A1 | 12/2011 |
| DE | 102011051178 A1 | 12/2012 |
| DE | 102012223536 A1 | 6/2014 |
| DE | 102012223541 A1 | 6/2014 |
| EP | 0260699 A2 | 3/1988 |
| EP | 0480451 A1 | 4/1992 |
| EP | 0645576 A1 | 3/1995 |
| EP | 0691518 A1 | 1/1996 |
| EP | 0860669 A1 | 8/1998 |
| EP | 1087186 A2 | 3/2001 |
| EP | 1200785 A1 | 5/2002 |
| EP | 1243880 A1 | 9/2002 |
| EP | 1484563 A1 | 12/2004 |
| EP | 1496322 A1 | 1/2005 |
| EP | 1505359 A1 | 2/2005 |
| EP | 1602425 A1 | 12/2005 |
| EP | 1624263 A2 | 8/2006 |
| EP | 2342511 A2 | 7/2011 |
| EP | 2543942 A2 | 1/2013 |
| EP | 2607073 A2 | 6/2013 |
| EP | 2789951 A1 | 10/2014 |
| EP | 2878427 A1 | 6/2015 |
| FR | 2991698 A1 | 12/2013 |
| FR | 2980963 A1 | 4/2014 |
| GB | 837929 A | 6/1960 |
| GB | 1214548 A | 12/1970 |
| JP | 51057777 | 5/1976 |
| JP | 59191588 | 12/1984 |
| JP | 03013779 A | 1/1991 |
| JP | 04165197 | 10/1992 |

(56) References Cited

FOREIGN PATENT DOCUMENTS

| | | |
|---|---|---|
| JP | 04309778 A | 11/1992 |
| JP | 06159922 A | 6/1994 |
| JP | 7001479 | 1/1995 |
| JP | H07167377 A | 7/1995 |
| JP | 08300052 | 11/1996 |
| JP | H08303686 A | 11/1996 |
| JP | H09166271 A | 6/1997 |
| JP | 10113983 | 5/1998 |
| JP | 11159693 A | 6/1999 |
| JP | 11311395 | 11/1999 |
| JP | 11336990 | 12/1999 |
| JP | 2000097390 | 4/2000 |
| JP | 2000117334 A | 4/2000 |
| JP | 2000320958 A | 11/2000 |
| JP | 2001038188 A | 2/2001 |
| JP | 2001116437 A | 4/2001 |
| JP | 03478771 | 6/2001 |
| JP | 2001336691 A | 12/2001 |
| JP | 2001343176 | 12/2001 |
| JP | 3438948 | 8/2003 |
| JP | 2004303695 | 10/2004 |
| JP | 2005114015 | 4/2005 |
| JP | 2005164193 | 6/2005 |
| JP | 2005256849 A | 9/2005 |
| JP | 2006077792 A | 3/2006 |
| JP | 2006161834 A | 6/2006 |
| JP | 2006161945 A | 6/2006 |
| JP | 03792801 B2 | 7/2006 |
| JP | 2006200685 A | 8/2006 |
| JP | 2007263186 A | 10/2007 |
| JP | 4111096 B2 | 7/2008 |
| JP | 2008157431 A | 7/2008 |
| JP | 2009063064 A | 3/2009 |
| JP | 2009162402 A | 7/2009 |
| JP | 2009524570 A | 7/2009 |
| JP | 2010017437 A | 1/2010 |
| JP | 2010071565 A | 4/2010 |
| JP | 2010108199 A | 5/2010 |
| JP | 2010145002 A | 7/2010 |
| JP | 04545126 B2 | 9/2010 |
| JP | 2010236770 A | 10/2010 |
| JP | 2010276309 A | 12/2010 |
| JP | 2011002033 A | 1/2011 |
| JP | 2011069612 A | 4/2011 |
| JP | 04779684 B2 | 9/2011 |
| JP | 2011196644 A | 10/2011 |
| JP | 4828353 B2 | 11/2011 |
| JP | 2012026493 A | 2/2012 |
| JP | 2012063029 A | 2/2012 |
| JP | 04897473 B2 | 3/2012 |
| JP | 2013195009 A | 3/2012 |
| JP | 2012087993 A | 5/2012 |
| JP | 2012163258 A | 8/2012 |
| JP | 2012189114 A | 10/2012 |
| JP | 2012242075 A | 12/2012 |
| JP | 2013002484 A | 1/2013 |
| JP | 2013050242 A | 3/2013 |
| JP | 2013050267 A | 3/2013 |
| JP | 2013076471 A | 4/2013 |
| JP | 2013088036 A | 5/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020050126499 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 2061925 C1 | 6/1996 |
| RU | 2077411 C1 | 4/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2529525 C1 | 9/2014 |
| RU | 2571031 | 12/2015 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 1998049506 A1 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 199920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 2003089729 A1 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 A1 | 8/2007 |
| WO | 2007106067 A2 | 9/2007 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 A1 | 12/2009 |
| WO | 2010007783 A1 | 1/2010 |
| WO | 2010029730 A1 | 3/2010 |
| WO | 2010043009 A2 | 4/2010 |
| WO | 2010092627 A1 | 8/2010 |
| WO | 2010127947 A2 | 11/2010 |
| WO | 2010127947 A3 | 2/2011 |
| WO | 2011058678 A1 | 5/2011 |
| WO | 2011003711 A3 | 6/2011 |
| WO | 2011081498 A3 | 11/2011 |
| WO | 2010007783 A1 | 1/2012 |
| WO | 2012023705 A3 | 4/2012 |
| WO | 2012026715 A3 | 6/2012 |
| WO | 2012043990 A3 | 6/2012 |
| WO | 2012044001 A3 | 6/2012 |
| WO | 2012119892 A1 | 9/2012 |
| WO | 2012152646 | 11/2012 |
| WO | 2012031885 A3 | 1/2013 |
| WO | 2012085212 A9 | 7/2013 |
| WO | 2014038150 A1 | 3/2014 |
| WO | 2014095542 | 6/2014 |
| WO | 2014121893 A1 | 8/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

International Search Report, International Application No. PCT/US2016/062804, dated Feb. 27, 2017, 9 pages.
International Search Report, International Application No. PCT/US2016/063023, dated Mar. 30, 2017, 7 pages.
International Search Report, International Application No. PCT/US2016/063065, dated Apr. 20, 2017, 9 pages.
International Search Report, International Application No. PCT/US2016/063355, dated Feb. 27, 2017, 9 pages.

(56) References Cited

OTHER PUBLICATIONS

International Search Report, International Application No. PCT/US2016/063958, dated Mar. 6, 2017, 10 pages.
International Search Report, Application No. PCT/US2017/021068, dated Nov. 2, 2017, 9 pages.
European Patent Office, "European Search Report," issued in connection with European Patent Application No. 14158615.6, dated Jun. 24, 2015, 5 pages.
International Search Report, PCT/US2016/043991, dated Apr. 27, 2017, 8 pages.
International Search Report, PCT/US2016/047558, dated Jun. 8, 2017, 9 pages.
International Search Report, PCT/US2016/062189, dated Mar. 30, 2017, 7 pages.
International Searching Authority, "Search Report," issued in connection with International Patent Application No. PCT/US2016/062479, dated Feb. 9, 2017, 8 pages.
International Searching Authority, "Search Report," issued in connection with International Patent Application No. PCT/US2016/060947, dated Feb. 2, 2017, 8 pages.
International Searching Authority, "Search Report," issued in connection with International Patent Application No. PCT/US2016/061125, dated Jan. 12, 2017, 9 pages.
International Searching Authority, "Search Report," issued in connection with International Patent Application No. PCT/US2016/062453, dated Feb. 9, 2017, 8 pages.
International Searching Authority, "Search Report," issued in connection with International Patent Application No. PCT/US2016/061790, dated Jan. 26, 2017, 8 pages.
International Searching Authority, "Search Report," issued in connection with International Patent Application No. PCT/US2016/062029, dated Jan. 26, 2017, 8 pages.
International Searching Authority, "Search Report," issued in connection with International patent Application No. PCT/US2016/060961, dated Feb. 2, 2017, 9 pages.
International Search Report, Application No. PCT/US2016/054067, dated Jun. 29, 2017, 7 pages.
International Search Report, Application No. PCT/US2016/054121, dated Jul. 6, 2017, 9 pages.
International Search Report, Application No. PCT/US2016055161, dated Jun. 29, 2017, 9 pages.
International Search Report, Application No. PCT/US2016/055304, dated Jun. 29, 2017, 9 pages.
International Search Report, PCT/US2016/053711, dated Aug. 31, 2017, 8 pages.
International Search Report, PCT/US2016/054639, dated Aug. 17, 2017, 8 pages.
International Search Report, PCT/US2016/057271, dated Aug. 17, 2017, 8 pages.
International Search Report, PCT/US2017/017802, dated Sep. 28, 2017, 9 pages.
International Search Report, PCT/US2017/019930, dated Sep. 28, 2017, 9 pages.
BASF, "Balindur™ Solutions for fixing Vaccum Insulated Panels," web page, 4 pages, date unknown, http://performance-materials.basf.us/products/view/family/balindur, at least as early as Dec. 21, 2015.
BASF, "Balindur™," web page, 2 pages, date unknown, http://product-finder.basf.com/group/corporate/product-finder/en/brand/BALINDUR, at least as early as Dec. 21, 2015.
PU Solutions Elastogram, "Balindur™ masters the challenge," web page, 2 pages, date unknown, http://product-finder.basf.com/group/corporate/product-finder/en/literature-document:/Brand+Balindur-Flyer—Balindur+The+new+VIP+fixation+technology-English.pdf, Dec. 21, 2014.
European Patent Application No. 13775196.2, Supplemental Search Report, dated Dec. 7, 2015, 10 pages.
European Patent Application No. 14158608.1, Search Report, dated Sep. 30, 2014, 5 pages.
International Patent Application No. PCT/US2013036203, International Search Report, dated Jul. 26, 2013, 10 pages.
European Patent Application No. 15154577.9, Search Report, dated Jul. 20, 2015, 8 pages.
European Patent Application No. 14158619, Search Report, dated Jun. 22, 2015, 9 pages.
European Patent Application No. 15153481, Search Report, dated Jul. 10, 2015, 6 pages.
KitchenAid, "Refrigerator user instructions," Sep. 5, 2015, 120 pages.

MULTI-SECTION CORE VACUUM INSULATION PANELS WITH HYBRID BARRIER FILM ENVELOPE

CROSS-REFERENCE TO RELATED APPLICATION

This application is a divisional of U.S. patent application Ser. No. 14/187,605, filed on Feb. 24, 2014, now U.S. Pat. No. 9,689,604, issued on Jun. 27, 2017, entitled "MULTI-SECTION CORE VACUUM INSULATION PANELS WITH HYBRID BARRIER FILM ENVELOPE," the entire disclosure of which is hereby incorporated herein by reference.

BACKGROUND OF THE INVENTION

Figure 1:
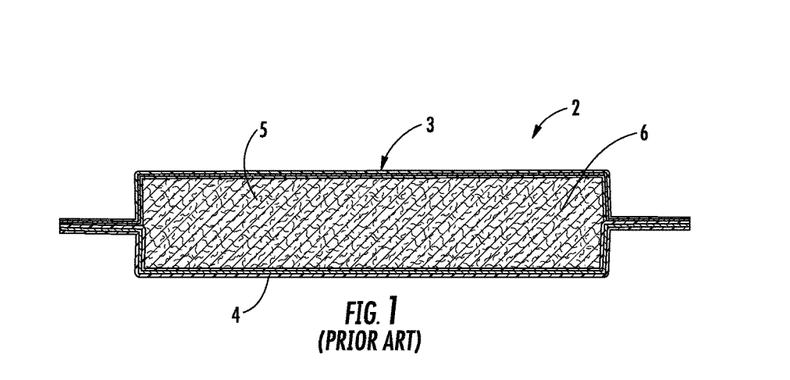
FIG. 1 is a cross-sectional view of a prior art vacuum insulation panel.

Vacuum insulation panels are shown in FIG. 1A of the present application, known vacuum insulation panels generally have a first side material 3, a second side material 4 that are typically the same and a single filling material 5. The single filling material may be a fiberglass material 6. As shown in FIG. 1A, both the first side and second side contain a metal foil layer between two thermal plastic layers.

BRIEF SUMMARY OF THE INVENTION

An aspect of the present invention is generally directed toward a multi-layer vacuum insulted panel that includes a first barrier film; a second barrier film; a sealing junction between the first barrier film and the second barrier film; a multi-section central core. The first barrier film includes at least one polymeric material. The first barrier film is free of a metal layer and has an interior facing surface. The second barrier film includes at least one interior polymeric layer, a metal foil layer and at least one exterior polymeric layer positioned on the opposite side of the metal foil layer at the at least one interior polymeric layer. The second barrier layer and first polymeric barrier layer define an interior volume between the first polymeric barrier layer and the second polymeric barrier layer. The interior volume has a width, a length, and a height. The sealing junction between the first barrier film and the second barrier film is located at a sealing section about a perimeter of the first barrier film and the second barrier film where the first barrier film and the second barrier film physically engage one another. The multi-section central core has a first fumed silica region that includes at least one fumed silica compound and at least one fiberglass region that are each discrete regions within the interior volume. The first fumed silica region is positioned within the interior volume and further positioned either (a) along at least a majority of a portion of the interior facing surface of the first barrier film or (b) along and proximate the sealing section and bridging sealing junction where the first barrier film and second barrier film engage one another. The portion of the interior volume free of the first fumed silica region defines a remaining interior volume. Each of the at one least fiberglass region(s) is (are) positioned within the remaining interior volume.

According to another aspect of the present invention, a multi-layer vacuum insulating panel includes a first barrier film, a second barrier film, a connection between the first barrier film and the second barrier film, and a bi-layer central core. The first barrier film typically includes a plurality of polymeric material layers where at least two of the plurality of polymeric layers are formed of different polymers and the first barrier film is free of a metal layer of material, more typically free of any metal material. The first barrier film has an interior facing surface and outwardly extending perimeter rim portion. The second barrier film typically includes at least one interior polymeric layer, a metal foil layer, and at least one exterior polymeric layer positioned on the opposite side of the metal foil layer as the at least one interior polymeric layer. The second barrier layer film and the first barrier film define an interior volume between the first barrier film and the second barrier film. The interior volume has a width, a length, and a height. The second barrier film has an outwardly extending perimeter rim portion. The connection between the first barrier film and the second barrier film is located about the outwardly extending perimeter of the first barrier and the second barrier film where the first barrier film and the second barrier film physically engage one another. The bi-layer central core generally includes a desiccant region and a fibrous region, typically a fiberglass containing region that are typically each discrete regions within the interior volume. Each region makes up from about 30% to about 70% of the interior volume and the desiccant region is positioned adjacent the first barrier film and the fibrous region is positioned adjacent the second barrier film more typically the desiccant region makes up over 50% of the interior volume.

Yet another aspect of the present invention includes a method of producing a multi-layer vacuum insulating panel includes the steps of: providing a first barrier film that includes a plurality of polymeric material layers where at least two of the plurality of polymeric layers are formed of different polymers and the first barrier film is free of a metal layer and the first barrier film has a first surface; providing a second barrier film that includes at least one interior polymeric layer, a metal foil layer, and at least one exterior polymeric layer positioned on the opposite side of the metal foil layer as the at least one interior polymeric layer; forming a desiccant layer that includes fumed silica power adjacent the first surface of the first barrier film; forming a fiberglass layer over at least substantially all of the desiccant layer; layering the second barrier film over the fiberglass layer; and heat sealing a perimeter of the first barrier film with a perimeter of the second barrier film to form the multi-layer vacuum insulating panel.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

Figure 2:
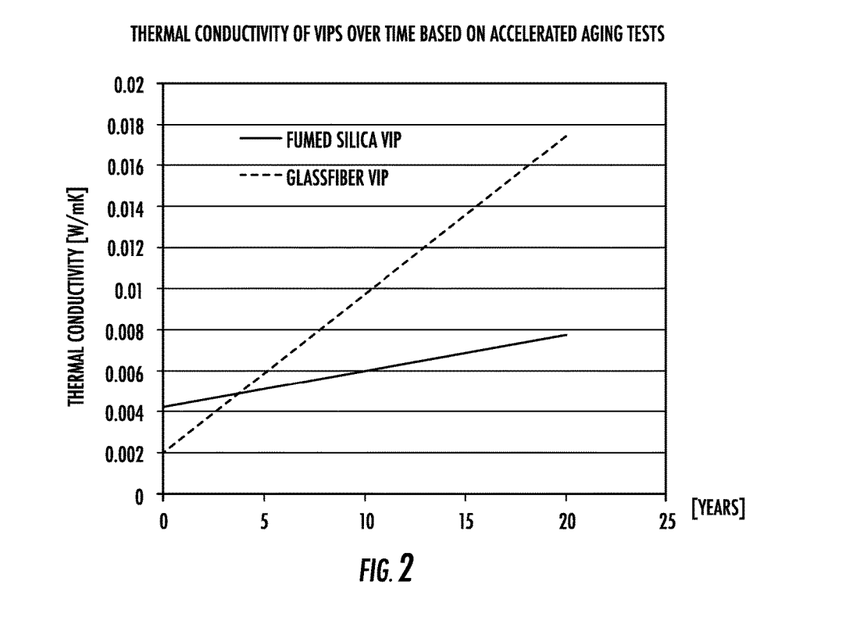
FIG. 2 is a chart showing the thermal conductivity of vacuum insulation panels containing entirely fiberglass and entirely fumed silica with their interior overtime based on accelerated aging tests.
Figure 3:
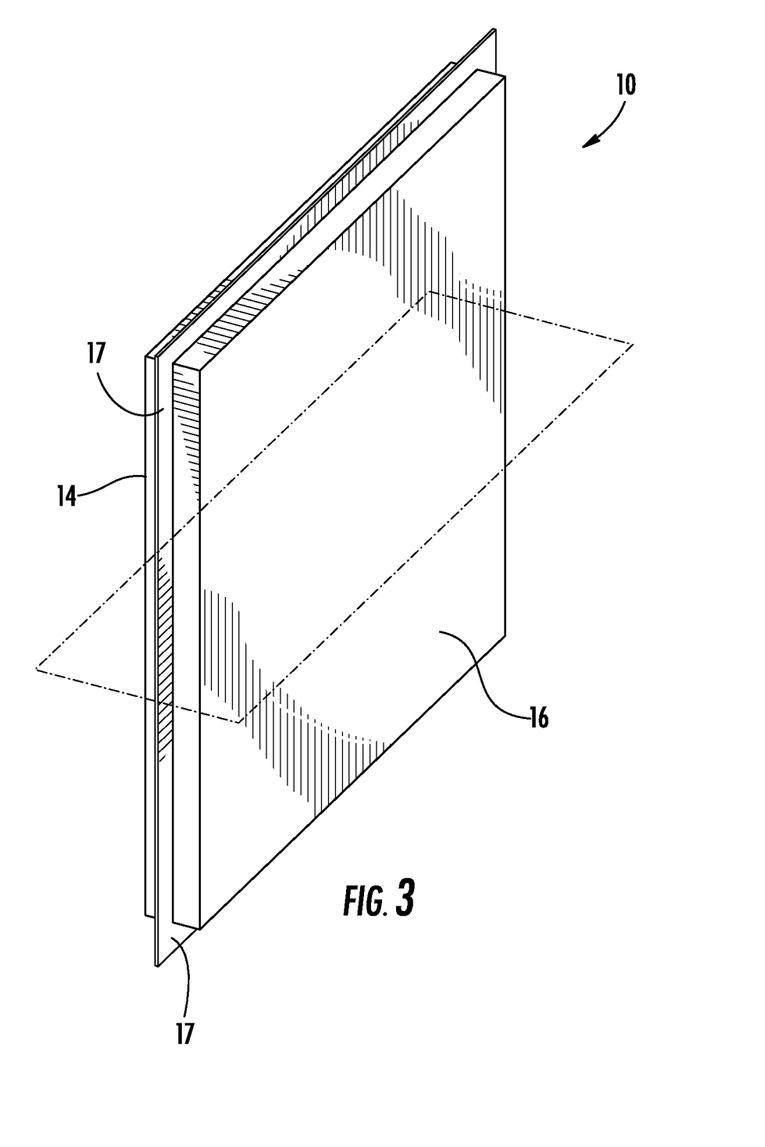
FIG. 3 is a perspective view of a vacuum insulation panel according to an aspect of the present invention.

The present invention is generally directed toward a multi-section core vacuum insulation panel(s) 10 that can be used in connection with insulating an appliance 12. (See FIGS. 3 and 8). As shown in the attached FIG. 2, vacuum insulation panels containing solely fumed silica do not have as high of an initial thermal conductivity compared to vacuum insulation panels containing solely glass fibers, but have less thermal conductivity over a majority of the time period and significantly less as a greater amount of time passes. However, a significant improvement in thermal conductivity is achieved by use of vacuum insulation panels solely containing fiber glass over the first few years.

As shown in FIGS. 3-8A, the multi-section core vacuum insulation panels 10 according to various aspects of the present invention generally include a first barrier film 14; a second barrier film 16; a sealing junction 18; and multi-section core 20 within the interior volume defined by the first barrier film 14 and the second barrier film 16.

Generally speaking, the first barrier film may include one or more layers of the same or various polymeric materials. Such polymeric materials typically include polyethylene terephthalate, polybutylene terephthalate, polypropylene and nylon. One or more combinations of various polymeric materials may be used. Typically the interior facing layer is a heat sealing layer that is often a low density polyethylene layer. The first barrier film is typically free of a metal foil layer and more typically free of metal entirely.

The second barrier film typically includes a metal foil layer 30. Typically, the metal foil layer is the central layer of a three (or more) layer system where an outer layer (or layers) of a polymeric material(s) 32 is (are) on one side of the metal foil and at least one heat seal layer on the interior facing opposite side of the metal foil layer. The interior facing opposite side of the metal foil may have one or more polymeric material layers 34 positioned between the heat seal layer and the metal foil layer. The heat seal layer is a polymeric material typically a low density polyethylene layer, as discussed above.

Most commonly the second barrier film is a three layer film that includes an outer protective layer of polyethylene terephthalate, an aluminum foil middle layer where the aluminum foil has a thickness of at least about 6 μm, and a heat seal layer on the interior facing side of the second barrier film which is typically a low density polyethylene. As discussed above, additional polymer layers on either side of the metal foil layer may be employed. Two or more polymer layers may be employed on the outer facing side of the metal foil and two or more polymeric materials may be placed on the interior facing side of the metal foil. Other possible polymeric materials include those discussed above: polypropylene, nylon, and metalized polyethylene terephthalate. The second barrier film contains an aluminum layer while the first barrier film is typically free of any metal layer more typically free of any metal.

This vacuum insulated panel construction with only one barrier film side containing a metal foil and the other being metal foil layer free helps to facilitate less edge loss, the gas and water penetration through the side of the vacuum insulation panel, thus strikingly increasing the longevity of the vacuum insulation panel.

According to an aspect of the present invention, as shown in FIGS. 4-7, the interior volume of the multi-section core 20, which is defined by the interior facing surfaces 22, 24 of the first barrier film and the second barrier film respectively, contains at least two discrete regions containing a desiccant such as a fumed silica in one region and a inorganic fiber material such as fiberglass in the other discrete region. In addition to fiberglass, other inorganic fibers may be used instead of or in addition to fiberglass. The other fibers include inorganic wool and ceramic fibers.

Figure 4:
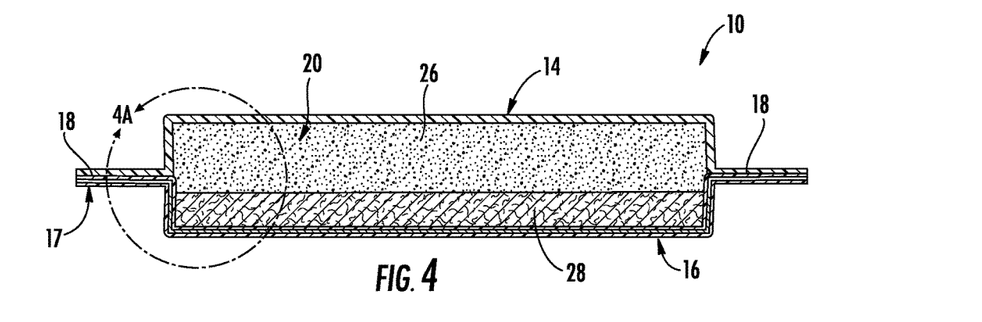
FIG. 4 is a cross-sectional view taken along the plane shown in FIG. 3 according to an embodiment of the present invention.
Figure 4A:
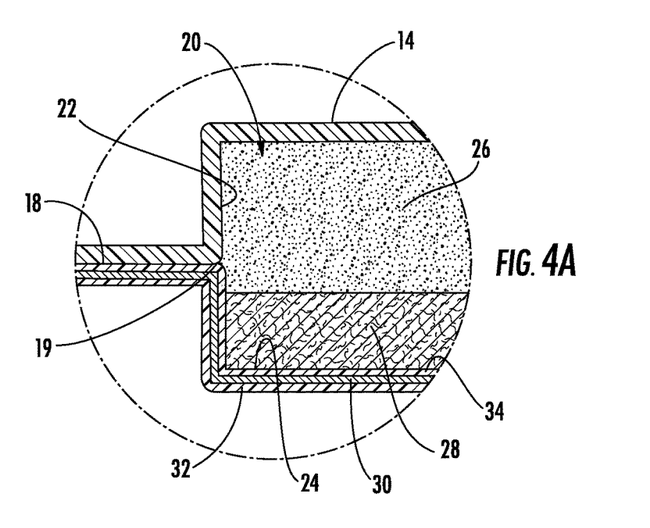
FIG. 4A is an enlarged view of the section designated 4A in FIG. 4 of the present application.
Figure 5:
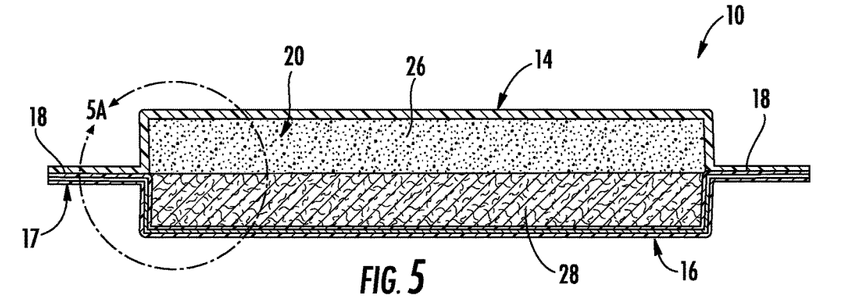
FIG. 5 is a cross-sectional view taken along the plane shown in FIG. 3 according to an embodiment of the present invention.
Figure 5A:
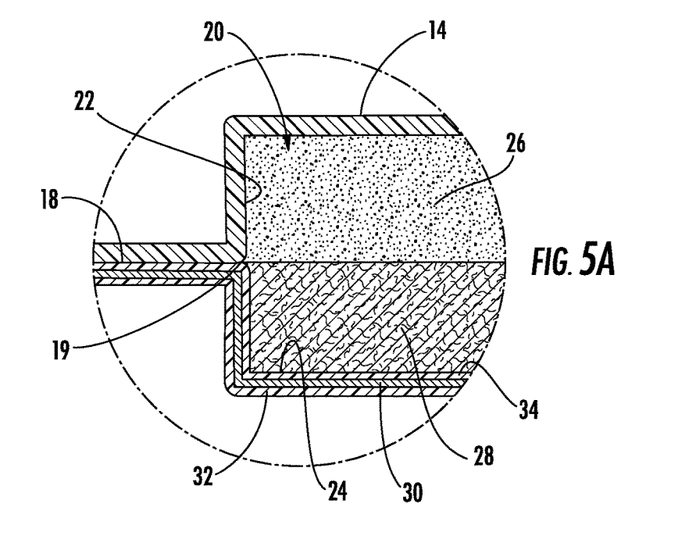
FIG. 5A is an enlarged view of the section designated 5A in FIG. 5 of the present application.

The desiccant region 26 and the fibrous region 28 are shown in FIGS. 4-5A as extending substantially across the width of the vacuum insulation panel 10. As these Figures also show the desiccant region as making up approximately 60% (FIGS. 4 and 4A) or about 50% (FIGS. 5 and 5A) of the interior volume of the vacuum insulation panel and similarly the fibrous region making up about 40% and approximately 50% of the interior volume of the vacuum insulation panel. The desiccant region and the fibrous region in these embodiments are generally rectangular cuboid in shape in the finished vacuum insulation panel. The desiccant region consists essentially of desiccant, i.e. the region is free of any other material that might materially adversely affect the moisture absorbing properties of the region. Minor aspects of impurities may be present, but are not preferred. Similarly, the fibrous region is typically comprised of one or more fibrous materials, typically fiberglass or one or more inorganic fibrous materials. This region similarly consists of essentially of inorganic material(s), typically one or more inorganic fibrous materials, but may contain minor amounts of other materials that do not materially affect the nature of the fibrous region, in particular that do not materially affect the nature of the vacuum insulating panel's construction and/or the insulation properties of the material(s) within the fibrous region(s).

Importantly, the desiccant region(s) typically encompasses at least about 30%, 50%, over 50%, about 55%, about 60% or more, about 70% or more, or about 75% or more of the total interior volume of the vacuum insulation panel. Additionally, while it is possible to locate the desiccant region elsewhere in the vacuum insulation panel, the most significant improvements are achieved by having the desiccant region cover all of the volume defined by the first barrier film and extending over the sealing junction 18 into at least a portion of the interior volume defined by the second barrier film 16 as shown in FIGS. 4-5A. The desiccant increases the longevity of the vacuum insulation panel due to its moisture absorbing properties. As moisture is transmitted through the first barrier film, moisture vapor is absorbed and typically captured and retained by the large amount of desiccant material thereby preventing loss of vacuum pressure in the vacuum insulation panel and increasing the longevity of the vacuum insulation panel.

The desiccant region may include a plurality of the different desiccants. A preferred desiccant is a fumed silica powder. The fumed silica may be a pyrogenic silica having microscopic droplets of amorphous silica fused together. The fumed silica may have a (Brunauer Emmett and Teller BET) specific surface area of at least 380 m$^2$/g. A higher surface area and moisture absorption rate material is most preferred. The desiccant region will either be positioned within the interior volume of the vacuum insulation panel along at least a majority (typically all) of the interior facing surface of the first barrier film and/or along and approximate the sealing junction 18 of the sealing section 17 between the first barrier film 14 and the second barrier film 16, specifically along and proximate the sealing junction 18 and bridging the junction point where the first barrier film and the second barrier film engage one another(in the cross section). The desiccant region is typically contains one or more fumed silica and is free of fibrous material. More typically, the desiccant region is a single fumed silica powder only and free of any other materials. The desiccant material, as shown in FIGS. 4-5A, typically extends across the width and length of the interior volume.

Similarly, the fibrous region may contain a plurality of the different (inorganic) fiber materials, but typically contains one or more fiberglass materials. As shown in FIGS. 4-5A, the fibrous region is typically a rectangular cuboid shaped material in the completed vacuum insulation panels and extends such that it covers the interior surface of the second barrier film. The fibrous region also typically extends across the width and length of the interior volume.

Figure 6:
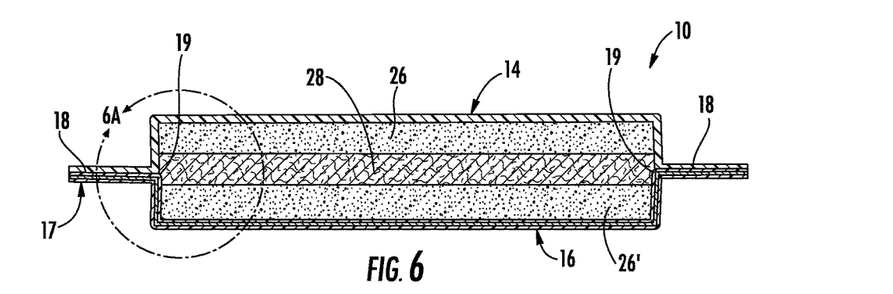
FIG. 6 is a cross-sectional view taken along the plane shown in FIG. 3 according to an embodiment of the present invention.
Figure 6A:
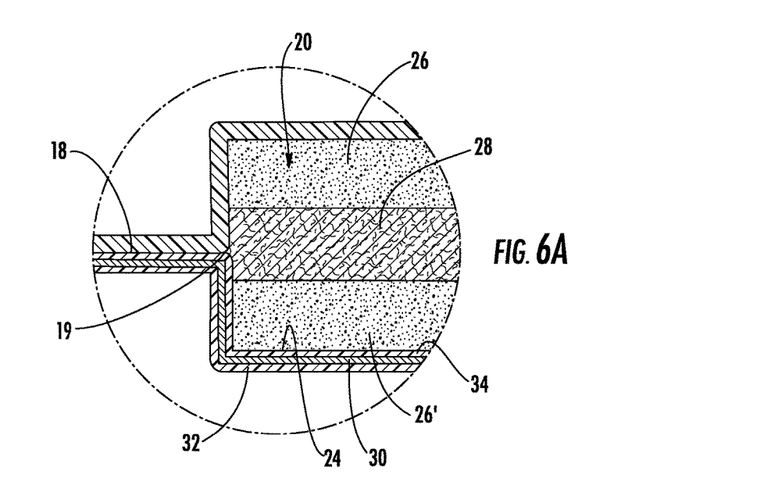
FIG. 6A is an enlarged view of the section designated 6A in FIG. 6 of the present application.

An alternative embodiment is shown in FIGS. 6 and 6A. In this embodiment, the fibrous material bridges the junction point 19 between the first barrier film 14 and the second barrier film 16 forming a rectangular cuboid central layer. The desiccant regions 26, 26' are on opposing sides of the fibrous region. Both desiccant regions are similarly rectangular cuboid in shape.

Figure 7:
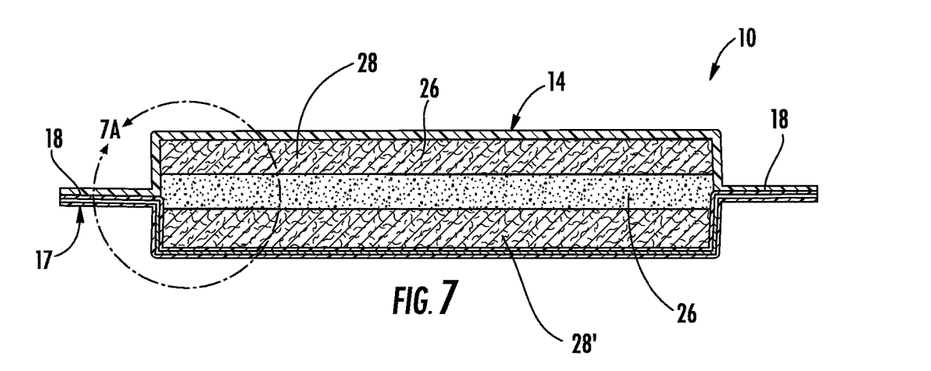
FIG. 7 is a cross-sectional view taken along the plane shown in FIG. 3 according to an embodiment of the present invention.
Figure 7A:
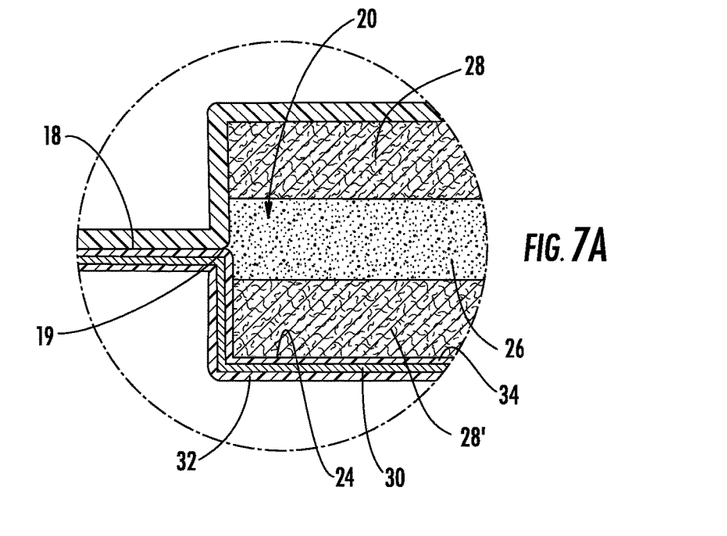
FIG. 7A is an enlarged view of the section designated 7A in FIG. 7 of the present application.

Another aspect of the present invention is shown in FIGS. 7 and 7A. In this aspect, the desiccant region is a rectangular cuboid bridging the sealing junction 18 and the junction point 19 between the first barrier film 14 and the second barrier film 16. The fibrous regions 28, 28' are similarly rectangular cuboid in shape and on opposing sides of the central desiccant region.

Figure 8:
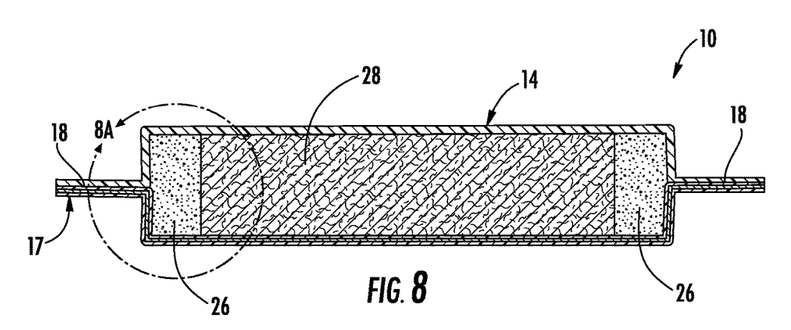
FIG. 8 is a cross-sectional view taken along the plane shown in FIG. 3 according to an embodiment of the present invention.
Figure 8A:
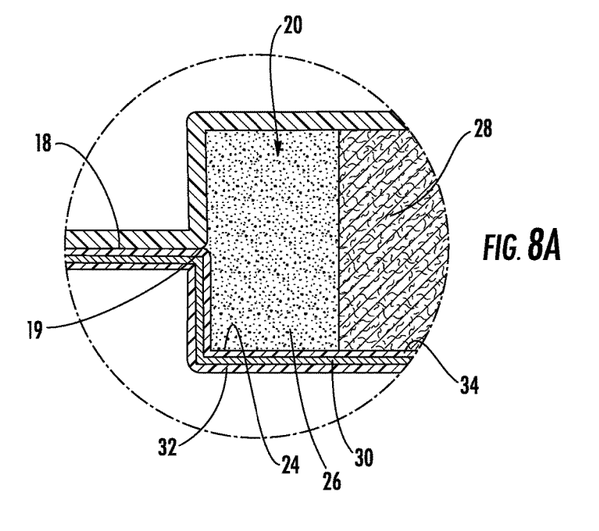
FIG. 8A is an enlarged view of the section designated 7A in FIG. 7 of the present application.

Another aspect of present invention is shown in FIGS. 8 and 8A. In this aspect, the desiccant region occupies the volume about the perimeter of the vacuum insulation panel on all four sides of the vacuum insulation panel interior and bridges the sealing junction 18 between the first barrier film 14 and the second barrier film 16 and extends from the first barrier film to the second barrier film. The fibrous region 28 occupies the center portion of the interior volume of the vacuum insulation panel.

The multi-section core vacuum insulation panels of the present invention typically have an initial thermal conductivity of about 3 mW/m·K and after 10 years has a thermal conductivity of at least about 8 mW/m·K or less (based upon 180 day accelerated aging test at 82° C. to simulate wear after 10 years in real application).

Figure 10:
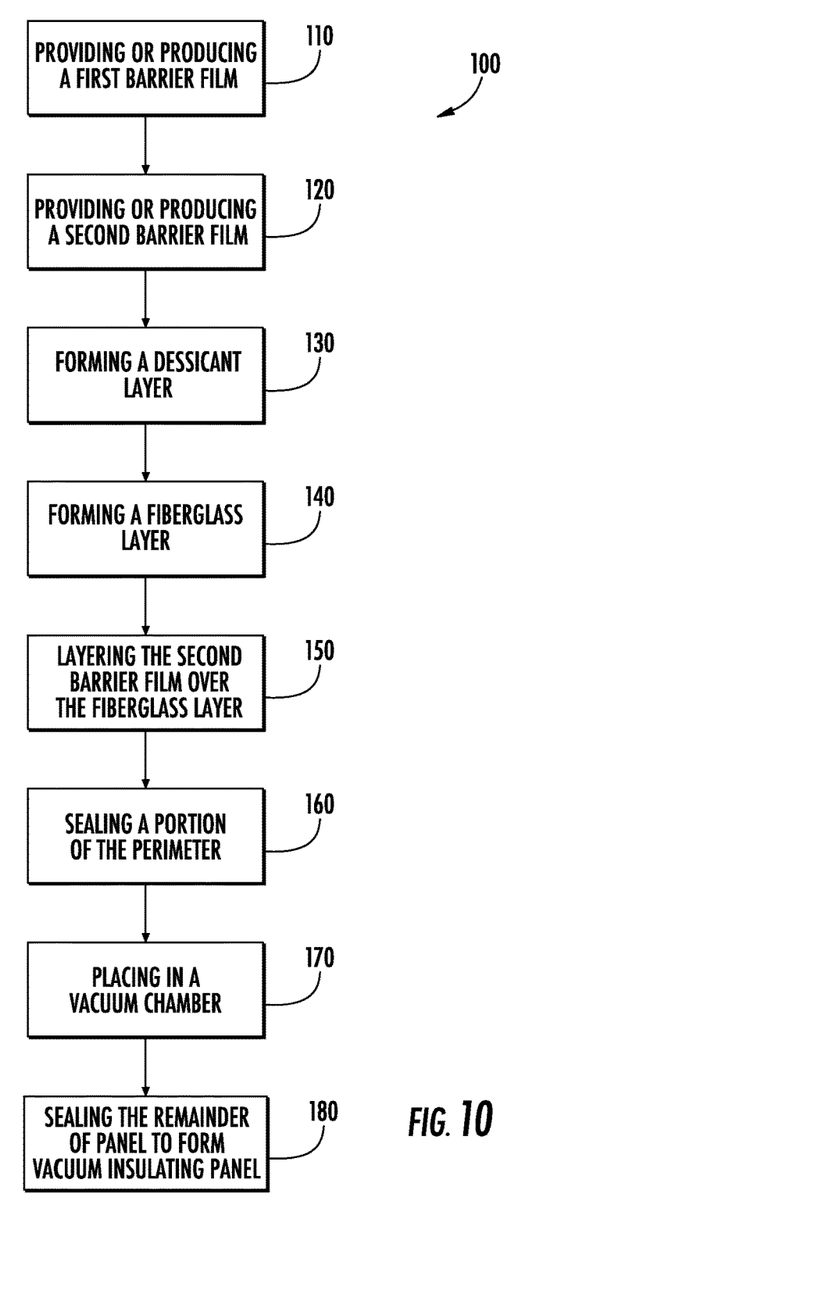
FIG. 10 is a flow chart showing a process of producing a multi-section core vacuum insulation panel according to an aspect of the present invention.

The method of producing the multi-layer insulating panel(s) 100 described herein typically includes the step of producing or providing a first barrier film 110 comprising a plurality of polymeric material layers where at least two of the plurality of polymeric layers are formed of different polymers and the first barrier film is free of a metal layer and has a first surface. The process further typically includes producing or providing a second barrier film 120 that includes at least one interior polymeric layer, a metal foil layer (typically an aluminum foil layer) and more typically an aluminum foil layer having at least 6 microns thickness, at least one exterior polymeric layer positioned on the opposite side of the metal foil layer as the at least one interior polymeric layer.

The process further typically includes the step of forming at least one desiccant layer or region 130 that comprises, consists essentially of, or consists of a fumed silica powder. The desiccant layer is typically positioned adjacent the first surface of the first barrier film, but could alternatively be positioned such that it bridges the junction between the first barrier film and the second barrier film. The process further typically includes forming a fiberglass layer 140 over at least substantially all of the desiccant layer when the desiccant layer is a planar layer. This step may alternatively involve forming a fiberglass region or layer in such a manner as to fill the remaining interior volume of the multi-layer vacuum insulation panel being formed that is not occupied by the desiccant layer. The process typically next include layering the second barrier film over the fiberglass layer 150 when both the desiccant layer and fiberglass (fibrous) layer are planar or over the central core section of the vacuum insulated panel. Next a portion of the sealing section is sealed 160 around the perimeter of the vacuum panel. The partially sealed vacuum insulated panel is then placed in a vacuum chamber 170 where a vacuum is applied and the remaining, unsealed portion of the sealing section sealed 180, typically also by heat sealing.

Figure 9:
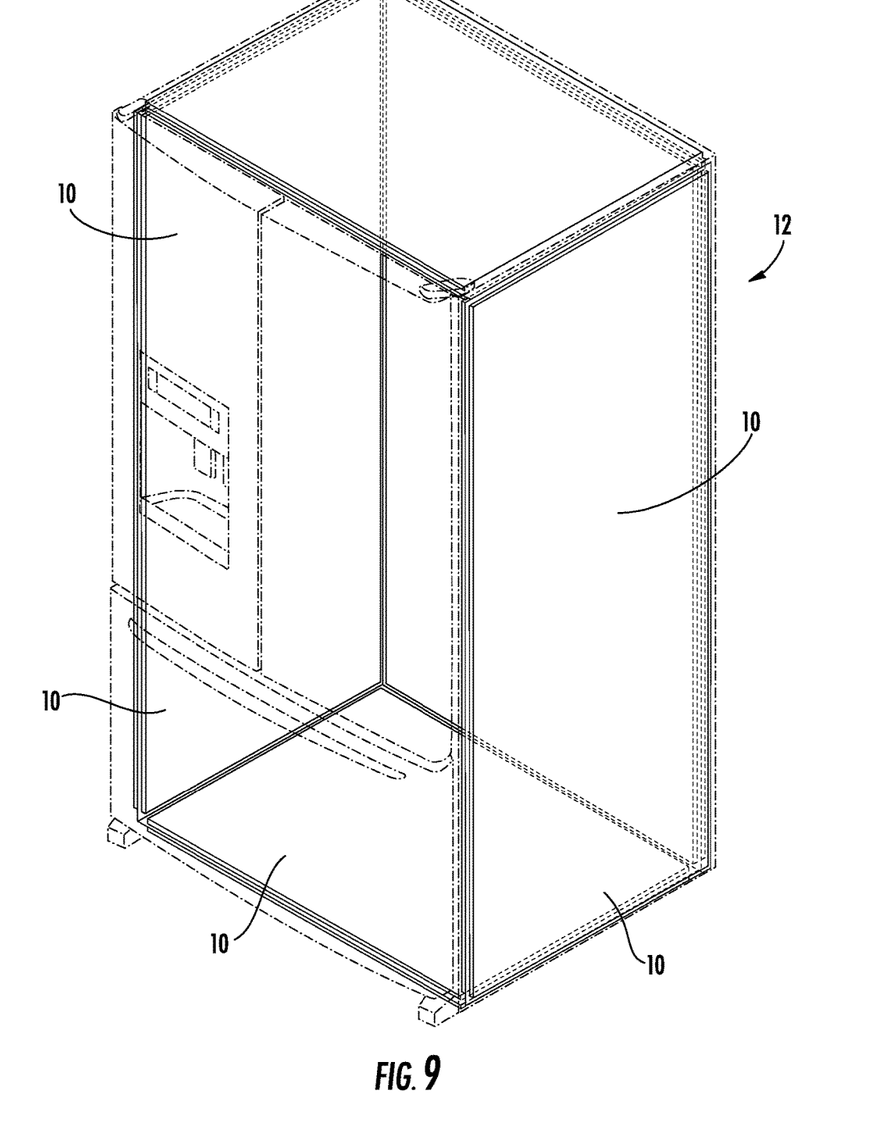
FIG. 9 is a perspective view of an appliance showing incorporation the multi-sectional core vacuum insulation panels within the appliance walls.

Thereafter, the completed multi-section core vacuum insulated panel may be installed between any two walls of an appliance, typically a refrigerator. (See FIG. 9). The panels may be placed between the exterior and interior walls or between two interior walls in a mullion. The thickness of a wall using the multi-section core vacuum insulated panels may maintain the same thickness as a wall without, but would conserve more energy or alternatively wall thickness may be lessened to increase interior volume of the appliance to allow for greater food storage while maintaining the same energy efficiency as an appliance with thicker walls employ more traditional urethane foam insulation only.

The invention claimed is:

1. A multi-layer vacuum insulating panel comprising:
a first barrier film comprising a plurality of polymeric material layers where at least two of the plurality of polymeric layers are formed of different polymers and the first barrier film is free of a metal layer and wherein the first barrier film has an interior facing surface and the first barrier film has an outwardly extending perimeter rim portion;
a second barrier film comprising at least one interior polymeric layer, a metal foil layer, and at least one exterior polymeric layer positioned on the opposite side of the metal foil layer as the at least one interior polymeric layer; wherein the second barrier film and the first barrier film define an interior volume between the first barrier film and the second barrier film and wherein the interior volume has a width, a length and a height and the second barrier film has an outwardly extending perimeter rim portion; and
a connection between the first barrier film and the second barrier film is located about the outwardly extending perimeter of the first barrier film and the second barrier film where the first barrier film and the second barrier film physically engage one another; and
a bi-layer central core having a desiccant region and a fibrous region that are each discrete regions within the interior volume wherein each make up from about 30-70% of the interior volume and the desiccant region is positioned adjacent the first barrier film and the fibrous region is positioned adjacent the second barrier film.

2. The multi-layer vacuum insulating panel of claim 1, wherein:
the connection between the first barrier film and the second barrier film is a heat sealed connection and wherein the desiccant region and the fibrous region each make up about 50% of the interior volume.

3. The multi-layer vacuum insulating panel of claim 1, wherein:
the desiccant region comprises a pyrogenic silica having microscopic droplets of amorphous silica fused together, and wherein the pyrogenic silica has a Brunauer, Emmett and Teller (BET) specific surface area of at least 380 m2/g.

4. The multi-layer vacuum insulating panel of claim of claim 1, wherein:
the interior polymeric layer of the second barrier film is a polymer adapted to heat sealingly engage the first barrier film and the exterior polymeric layer is a polymeric protective layer comprising polybutylene terephthalate, and wherein the metal foil layer of the second barrier film is an aluminum foil layer, and wherein the desiccant region consists essentially of a fumed silica powder and the fibrous region consists essentially of a fiberglass.

5. The multi-layer vacuum insulating panel of claim 4, wherein:
the desiccant region and the fibrous region each make up from about 45% to about 55% of the interior volume and wherein the second barrier film allows less moisture transmission through the layer than the first barrier film.

6. The multi-layer vacuum insulating panel of claim 1, wherein:
the connection between the first barrier film and the second barrier film forms a sealing junction at a sealing section about the outwardly extending perimeter rim portion of the first barrier film;
wherein the desiccant region is positioned within the interior volume and further positioned either (a) along at least a majority of a portion of the interior facing surface of the first barrier film or (b) along and proximate the sealing section and bridging the sealing junction where the first barrier film and the second barrier film physically engage one another.

7. The multi-layer vacuum insulating panel of claim 1, wherein:
the fibrous region is positioned within the interior and extends across the width and length of the interior volume and is adjacent the second barrier film.

8. The multi-layer vacuum insulating panel of claim 7, wherein:
the desiccant region is positioned within the interior volume and extends across the width and length of the interior volume and is adjacent the first barrier film.

9. The multi-layer vacuum insulating panel of claim 1, wherein:
the desiccant region is positioned about a perimeter volume of the interior volume, wherein the perimeter volume is proximate the connection between the first barrier film and the second barrier film, and wherein the at least one desiccant region extends between the first barrier film and the second barrier film and wherein the fibrous region is positioned within a center volume of the interior volume and extends between the first barrier film and the second barrier film.

10. The multi-layer vacuum insulating panel of claim 9, wherein:
the desiccant region consists of fumed silica and the fibrous region consists of fiberglass.

11. The multi-layer vacuum insulating panel of claim 1, wherein:
the fibrous region extends across the width of the interior volume and the fibrous region is a continuous section.

12. The multi-layer vacuum insulating panel of claim 11, wherein:
the desiccant region is a continuous section of the multi-layer vacuum insulating panel.

13. The multi-layer vacuum insulating panel of claim 12, wherein:
the desiccant region comprises a first desiccant region, and
the fibrous region is positioned between the first desiccant region and a second desiccant region wherein the first desiccant region is positioned adjacent the first barrier film and the second desiccant region is positioned adjacent the second barrier film.

14. The multi-layer vacuum insulating panel of claim 1, wherein:
the first barrier film has at least one side wall about a perimeter of the first barrier film that extends away from the connection between the first barrier film and the second barrier film, and wherein the first barrier film further comprises a substantially planar center section interconnected with the at least one side wall such that the first barrier film is tray-shaped; and wherein the second barrier film has at least one side wall about a perimeter of the second barrier film that extends away from the connection between the first barrier film and the second barrier film, and further comprises a substantially planar center section interconnected with the at least one side wall such that the second barrier film is tray-shaped.

\* \* \* \* \*